UNITED STATES PATENT OFFICE.

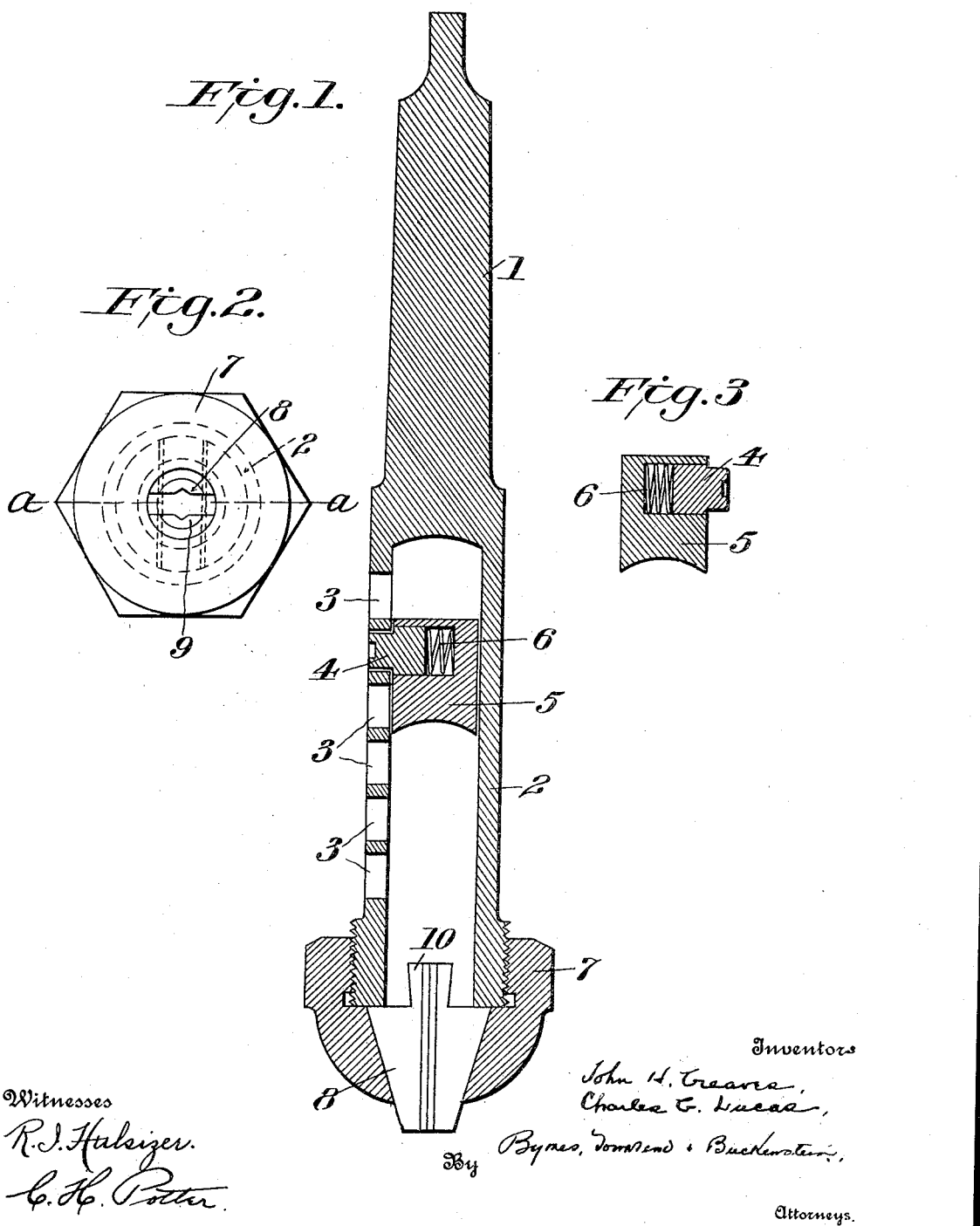

JOHN H. GREAVES AND CHARLES G. LUCAS, OF NEWPORT NEWS, VIRGINIA.

CHUCK.

1,110,770.    Specification of Letters Patent.    Patented Sept. 15, 1914.

Application filed April 16, 1913. Serial No. 761,592.

*To all whom it may concern:*

Be it known that we, (1) JOHN H. GREAVES, and (2) CHARLES G. LUCAS, citizens of the United States, residing at (1) 217 Thirty-fifth street and (2) 122 Thirty-fifth street, in the city of Newport News, county of Warwick and State of Virginia, have invented certain new and useful Improvements in Chucks, of which the following is a specification.

Our invention relates to a chuck for holding a tool, such as a drill, and has for its object to provide means for ready adjustment of the block or abutment against which bears the shank of the drill; to provide means for securing the clamping jaws to the chuck so that they can not fall out; and also to so construct the chuck that the fine chips produced during the drilling are prevented, as far as possible, from access to the working parts of the chuck.

These and other objects we attain by the construction shown in the accompanying drawings in which—

Figure 1 is a section on the line *a—a* of Fig. 2; Fig. 2 is a bottom plan view; and Fig. 3 is a section of the adjusting block.

Referring to the drawings, 1 is the shank of the chuck, having integral therewith the hollow spindle 2. This spindle has on one side a series of openings 3, into any one of which may project the pin 4 of an adjusting block 5, which is arranged to slide in the bore of the hollow spindle. The pin 4 has a slot or hole in its outer end for engagement with a tool, and is mounted in a socket in the adjusting block 5, this socket being of such depth that the pin 4 may be pushed inwardly against the compression spring 6 in the socket, and the block then moved up or down opposite to any one of the openings 3, whereupon the spring will force the pin out into such opening and thus hold the block in its adjusted position. The block 5 has an upwardly curved bottom in order to automatically center the drill shank.

7 is a clamping nut having internal screw-threads engaging exterior threads on the end of the spindle and having a frusto-conical opening at its lower end to engage with the correspondingly shaped clamping jaws 8 and 9. These jaws 8 and 9 have each at their upper end a dove-tail shaped tongue 10, fitting into a correspondingly shaped groove in the wall of the spindle, so that while these jaws may be moved by the nut 7 laterally toward and from each other to clamp and release the drill spindle, they can not drop out when the nut is unscrewed to release the drill.

The operation of the device will be apparent from the foregoing description, from which it will be noted that the device has few parts, is light and strong, and that the adjustment is quickly and easily effected.

We claim—

1. In a chuck, the combination with a hollow drill spindle, of a block arranged to slide therein, and coöperating means on said block and spindle for locking the block in its adjusted position, said means comprising a row of openings in one wall only of the spindle, and means carried by said block for detachable engagement with the walls of said openings.

2. In a chuck, the combination with a hollow drill spindle, of a block arranged to slide therein, and coöperating means on said block and spindle for holding the block in its adjusted position, said means comprising a row of openings in the wall of the spindle, and a spring-pressed pin mounted in said block.

In testimony whereof, we affix our signatures in presence of two witnesses.

JOHN H. GREAVES.
CHAS. G. LUCAS.

Witnesses:
CHARLES DUNCAN,
SOLLIE HOLLAND.